(12) United States Patent
Wang et al.

(10) Patent No.: US 11,091,173 B2
(45) Date of Patent: Aug. 17, 2021

(54) DRIVING SAFETY ENHANCING SYSTEM AND METHOD FOR MAKING OR ENABLING HIGHLY ACCURATE JUDGMENT AND PROVIDING ADVANCE EARLY WARNING

(71) Applicant: AUTOEQUIPS TECH CO., LTD., New Taipei (TW)

(72) Inventors: Ting-Peng Wang, New Taipei (TW); I-Jen Lai, New Taipei (TW)

(73) Assignee: AUTOEQUIPS TECH CO., LTD., New Taipei (TW)

( * ) Notice: Subject to any disclaimer, the term of this patent is extended or adjusted under 35 U.S.C. 154(b) by 0 days.

(21) Appl. No.: 16/854,547

(22) Filed: Apr. 21, 2020

(65) Prior Publication Data

US 2021/0001874 A1 Jan. 7, 2021

(30) Foreign Application Priority Data

Jul. 2, 2019 (TW) .................... 108123205

(51) Int. Cl.
*G08G 1/16* (2006.01)
*B60W 50/14* (2020.01)
*B60W 40/04* (2006.01)
*G01S 19/42* (2010.01)

(52) U.S. Cl.
CPC ............ *B60W 50/14* (2013.01); *B60W 40/04* (2013.01); *G01S 19/421* (2013.01); *B60W 2420/42* (2013.01); *B60W 2420/52* (2013.01)

(58) Field of Classification Search
CPC .... G08G 1/16; B60W 30/0953; B60W 50/14; B60Q 9/008; G01S 19/393
See application file for complete search history.

(56) References Cited

U.S. PATENT DOCUMENTS

2019/0263401 A1* 8/2019 Yoo ................... B60W 60/0015
2019/0295418 A1* 9/2019 Akamine ............... B60Q 9/008

* cited by examiner

*Primary Examiner* — Hongmin Fan
(74) *Attorney, Agent, or Firm* — Rabin & Berdo, P.C.

(57) ABSTRACT

A driving safety enhancing system and method for making or enabling highly accurate judgment and providing advance early warning essentially include an information collection module for sensing, and thereby obtaining information about, the surroundings of a vehicle to which the system is applied; a processing unit for analysis and judgment; and a positioning and communication module for carrying out sharing and exchange of positioning signals and positioning information, thereby increasing the range within which targets can be sensed, and the number of targets that can be sensed, for analysis and judgment by the processing unit, the objective being to increase the accuracy of judgment and provide necessary warning as early as possible so that the driver of the vehicle will be warned of an imminent emergency in advance and can therefore drive comfortably and safely.

9 Claims, 8 Drawing Sheets

DRIVING SAFETY ENHANCING SYSTEM AND METHOD FOR MAKING OR ENABLING HIGHLY ACCURATE JUDGMENT AND PROVIDING ADVANCE EARLY WARNING

BACKGROUND OF THE INVENTION

1. Technical Field

The present invention relates to an application of driver assistance and more particularly to a driving safety enhancing system and method that entail exchanging information to achieve highly accurate judgment in advance.

2. Description of Related Art

Recently, advanced driver-assistance systems (ADAS) have been a major subject of development for automobile manufacturers. An advanced driver-assistance system typically includes a variety of sensors and an electronic control unit (ECU). The sensors are installed on the vehicle to which the system is applied and are configured to collect data of the surroundings, with the vehicle serving as the basis of reference. The ECU analyzes the data collected by the sensors and will issue early warnings about potential dangerous situations in order for the driver of the vehicle to take necessary actions in advance or, in the case of an emergency, for the system to assist in performing an emergency operation so as to reduce the chance of accidents.

There is a wide array of advanced driver-assistance systems, some common examples of which are the blind spot detection (BSD) system, the autonomous emergency braking (AEB) system, the parking aid system (PAS), the adaptive cruise control (ACC) system, the lane departure warning (LDW) system, and the forward collision warning (FCW) system. Such systems may also work with sensors that are mounted inside the vehicle to identify the driver's face and determine the driver's level of attention, the objective being to monitor, and provide early warnings about, the driver's physiological conditions.

The accuracy of a conventional driver assistance system depends on the number and sensing quality of the sensors installed on the vehicle to which the system is applied and on the computation technique employed for analysis and judgment. To increase the accuracy, therefore, high-precision sensing devices, chips, and so on must be used, but the high cost incurred hinders extensive application of such accuracy enhancing designs. Moreover, as the sources of information of a conventional driver assistance system are chiefly the sensors on the vehicle to which the system is applied, the range within which targets can be sensed for analysis is limited, so when an emergency occurs, an early warning, if issued, may still fail to provide the driver with sufficient response time. For example, most drivers may keep a safe distance from the vehicle ahead (hereinafter referred to as a safe following distance) by applying the inter-vehicle distance rule or the time interval rule, and would speed up or slow down in accordance with the driving state of the vehicle ahead; however, the minimum safe following distance does not ensure the safety of driving at high speed. Generally, when the brake lamps of a vehicle are turned on, the driver of the following vehicle must take some time to perceive the lamps visually and to determine whether to change speed (e.g., by judging whether the vehicle ahead is slowing down slightly or is braked sharply), and yet a perception time as short as 1~2 seconds can render a safe following distance insufficient for the driver to stop their vehicle to prevent collision with the vehicle ahead, given that a vehicle at 100 km/h can move as far as 55 m or so in 2 seconds. While a conventional driving system can help a driver monitor the following distance, a system-assisted judgment is inadequate to prevent danger, simply considering the different conditions of each vehicle (e.g., load, tire performance, brake performance, and braking distance) and the limited sensing and identification capability of the system. According to a survey on "braking time vs accident incidence rate" conducted by the Swiss insurance company AXA Winterthur in 2009, 90% of the rear-end collisions surveyed could have been prevented if the drivers had been warned 1.5 seconds in advance, and almost all the collisions surveyed could have been prevented if the drivers had been warned 2 seconds in advance.

In addition, there are inevitable cases in which a conventional driver assistance system cannot provide adequate sensing as expected, let alone warning. For example, it is difficult, if not impossible, for a conventional driver assistance system to detect a person or vehicle emerging suddenly from behind a column or short wall, the accuracy of environment sensing and analysis tends to be lowered at night, and system misjudgment is likely to result from fog and heavy rain. All of the above indicates that the existing driver assistance systems still leave plenty of room for improvement.

BRIEF SUMMARY OF THE INVENTION

Generally, the structure of a conventional driving safety enhancing system includes an information collection module and a processing unit. The information collection module includes a plurality of on-board sensors for sensing the surroundings of the vehicle to which the system is applied (hereinafter referred to as the vehicle at issue) and thereby obtaining sensing information of the vehicle at issue. The processing unit is connected to the information collection module and is configured to identify people or vehicles around the vehicle at issue according to the sensing information, to perform an analysis and judgment process on the people or vehicles identified, and to output a control signal if necessary, in order for the control signal to trigger a reduction in speed or the issue of a warning to enhance driving safety.

The primary objective of the present invention is to provide a driving safety enhancing system and method that make or enable highly accurate judgment and provide advance early warning. By sharing sensing and positioning information, the range within which targets can be analyzed and judged by the system and hence the base number of targets are significantly increased to strengthen the prediction ability of the system effectively. Thus, in addition to making or enabling highly accurate judgment, the system can issue warnings earlier than its prior art counterparts, allowing a driver to be warned of an imminent emergency ahead of time and take necessary actions as soon as possible.

To achieve the above objective, the method of the present invention for making or enabling highly accurate judgment and providing advance early warning is applied to the aforesaid conventional driving safety enhancing system and essentially includes: (a) providing a positioning and communication module connected to the processing unit; (b) obtaining positioning signals via the positioning and communication module so as to locate the vehicle to which the system is applied (i.e., the vehicle at issue) and people or vehicles around the vehicle at issue and thereby obtain positioning information of the vehicle at issue; (c) obtaining extended positioning information of other people or vehicles via the positioning and communication module through wireless communication; (d) combining and cross-comparing the positioning information of the vehicle at issue and the extended positioning information to identify all the people or vehicles within a certain range of the vehicle at issue; and (e) analyzing and judging changes in the moving states of all the people or vehicles identified, in order to output the control signal if necessary.

In summary of the above, the structure of the driving safety enhancing system of the present invention essentially includes an information collection module, a processing unit, and a positioning and communication module. The information collection module includes a plurality of on-board sensors for sensing the surroundings of the vehicle to which the system is applied (i.e., the vehicle at issue) and thereby obtaining sensing information of the vehicle at issue. The processing unit is connected to the information collection module and is configured to identify people or vehicles around the vehicle at issue according to the sensing information and, after analysis and judgment, output a control signal if necessary. The positioning and communication module is connected to the processing unit and is configured to obtain positioning signals and transmit positioning information. The processing unit locates the vehicle at issue and the people or vehicles around the vehicle at issue according to the positioning signals and thereby obtains positioning information of the vehicle at issue. Also, the processing unit obtains extended positioning information of other people or vehicles through the positioning and communication module, combines and cross-compares the positioning information of the vehicle at issue and the extended positioning information to identify all the people or vehicles within a certain range of the vehicle at issue, analyzes and judges changes in the moving states of all the people or vehicles identified, and outputs a control signal if necessary.

Through a positioning and information sharing process, the driving safety enhancing system of the present invention can identify and track a plurality of targets (which refer to moving objects identifiable by the system, such as people or vehicles) that cannot be sensed by the vehicle at issue, and this technical feature contributes to the high accuracy and early warning function of the system. Compared with the conventional driving systems (whose on-board sensors can sense targets only within a limited range), the invention enables prediction over a greater distance so that the driver of the vehicle at issue can be warned of a danger ahead of time. The invention not only overcomes the environmental limitations of sensors, but also can determine the locations of targets accurately by comparing information from different sources, without resorting to prohibitively expensive sensors, thereby achieving both high accuracy and wide applicability.

The present invention is not restricted to monitoring the minimum safety following distance but can be used to observe and track moving targets outside the traditional safe distance and provide earlier warning than conventionally allowed when a risk is identified, giving a driver a few seconds' response time in advance. According to known survey results (such as those of the aforementioned survey conducted by the Swiss insurance company AXA Winterthur in 2009), a driver who has been warned can slow their vehicle and take necessary precautions sooner than one who has not, even if the driver cannot see, or cannot clearly see, what is happening (e.g., an accident taking place) ahead, and when the driver who has been warned approaches the accident area, he or she can handle the situation right away to avoid danger, without having to spend the few critical seconds on determining the nature or severity of the situation (which would in turn shorten the stopping distance); consequently, the chance of rear-end collision is substantially eliminated.

According to the foregoing structure of the present invention, the on-board sensors in the information collection module may be one, or a combination of at least two, of millimeter wave radars, ultrasonic radars, thermal radars, optical radars, and image sensors; the processing unit is an electronic control unit (ECU, a microcontroller designed specifically for use in vehicles) for performing analysis and computation, making judgments, and outputting the control signal; and the positioning and communication module includes a satellite positioning unit and a wireless communication unit, wherein the satellite positioning unit is configured to receive satellite positioning signals, i.e., GPS (Global Positioning System) positioning signals, and the wireless communication unit is configured to connect with a wireless communication network in order to obtain location-based service (LBS) positioning signals and transmit the aforesaid positioning information through the wireless communication network.

In practice, the processing unit derives the location of the vehicle at issue from an overall analysis of the satellite positioning signals (i.e., GPS positioning signals) and the LBS positioning signals obtained from the positioning and communication module; determines the locations of the targets (e.g., people or vehicles) around the vehicle at issue according to the location of the vehicle at issue and the sensing information (e.g., sensing directions and distances) of the on-board sensors; and thus generates the positioning information of the vehicle at issue. The processing unit shares the positioning information of the vehicle at issue with devices outside the system, as well as obtains the extended positioning information of other people or vehicles from outside the system, through the wireless communication unit; cross-compares the positioning information of the vehicle at issue and the extended positioning information to determine the locations of all the targets within a predetermined range of the vehicle at issue (which range can be far greater than the sensing range of the vehicle at issue); performs a time sequence analysis on the moving courses and momentum (i.e., moving directions and speeds) of all the targets and generates distance-related alert values according to the moving course and momentum of the vehicle at issue; and outputs the control signal when determining that the momentum of a target at a certain distance is lower than the corresponding alert value.

The control signal can be used for engine throttle control, brake control, alarm control, and so on. For example, the control signal can be output to the power system of the vehicle at issue so that when a certain alert criterion is met, the engine throttle will be automatically released or the brake will be automatically activated to reduce the speed of the vehicle at issue. Alternatively, the control signal can be output to an alarming device such as a buzzer or a voice playing device in order to provide an acoustic warning to the driver. The predetermined range of the vehicle at issue can be set according to user needs. For example, the predetermined distance can be increased or decreased according to the speed of the vehicle at issue or have different settings corresponding respectively to different driving states of the vehicle at issue. Setting the predetermined range of the vehicle at issue properly can prevent the system from analyzing an excessive amount of targets, which if happening will lower system performance.

Furthermore, the present invention can work with a map system (e.g., a Geographic Information System, GIS) by aggregating the moving states of all the targets located (e.g., people or vehicles) into a virtual map interface and outputting the interface to a display, which displays the interface. In practice, the processing unit is connected to a map database in order to obtain map information provided by the database. The map database may be stored in a storage unit of the system or be a remote map database accessible through the wireless communication unit.

BRIEF DESCRIPTION OF THE SEVERAL VIEWS OF THE DRAWINGS

The above objective, as well as the features and functions, of the present invention can be better understood by referring to the following detailed description of some illustrative embodiments in conjunction with the accompanying drawings, in which.

DETAILED DESCRIPTION OF THE INVENTION

Figure 1:
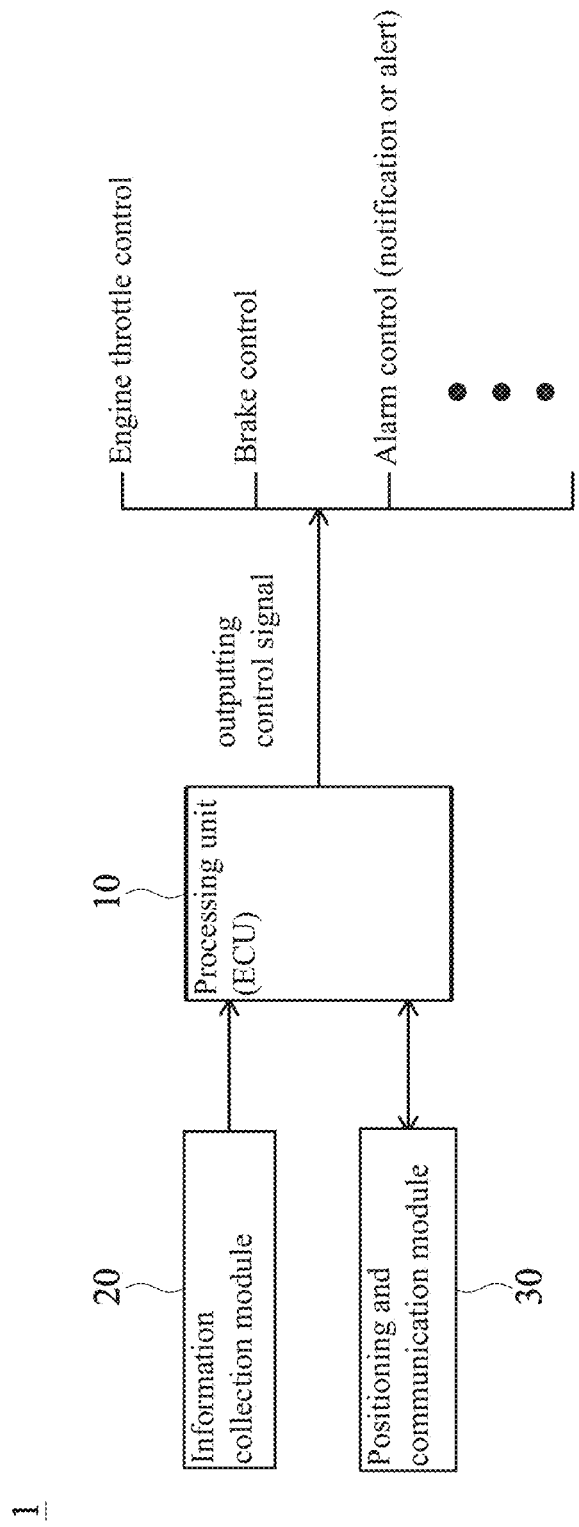
FIG. 1 is a simplified diagram of the system of the invention.
Figure 2:
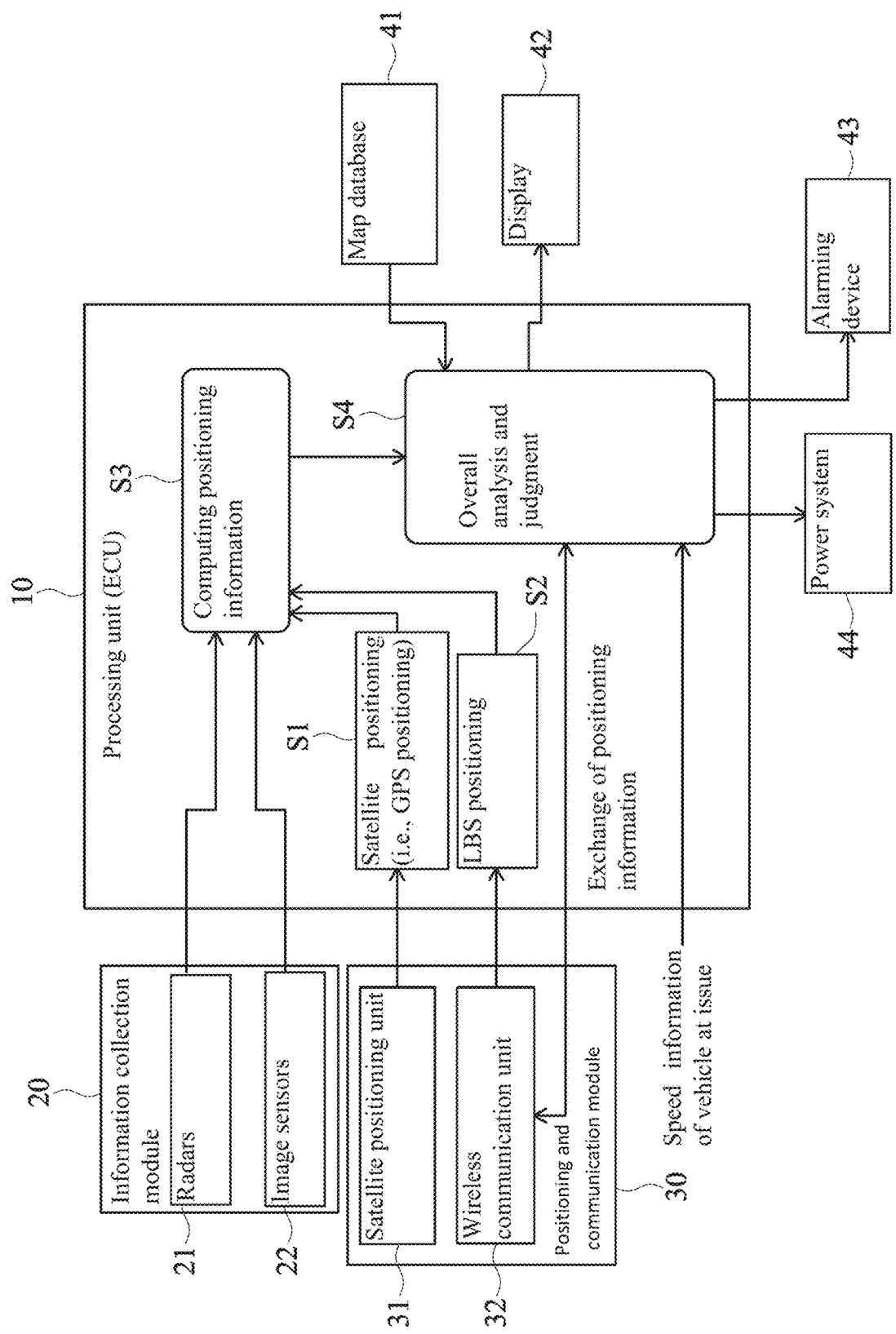
FIG. 2 shows the structure of the system of the invention.
Figure 3:
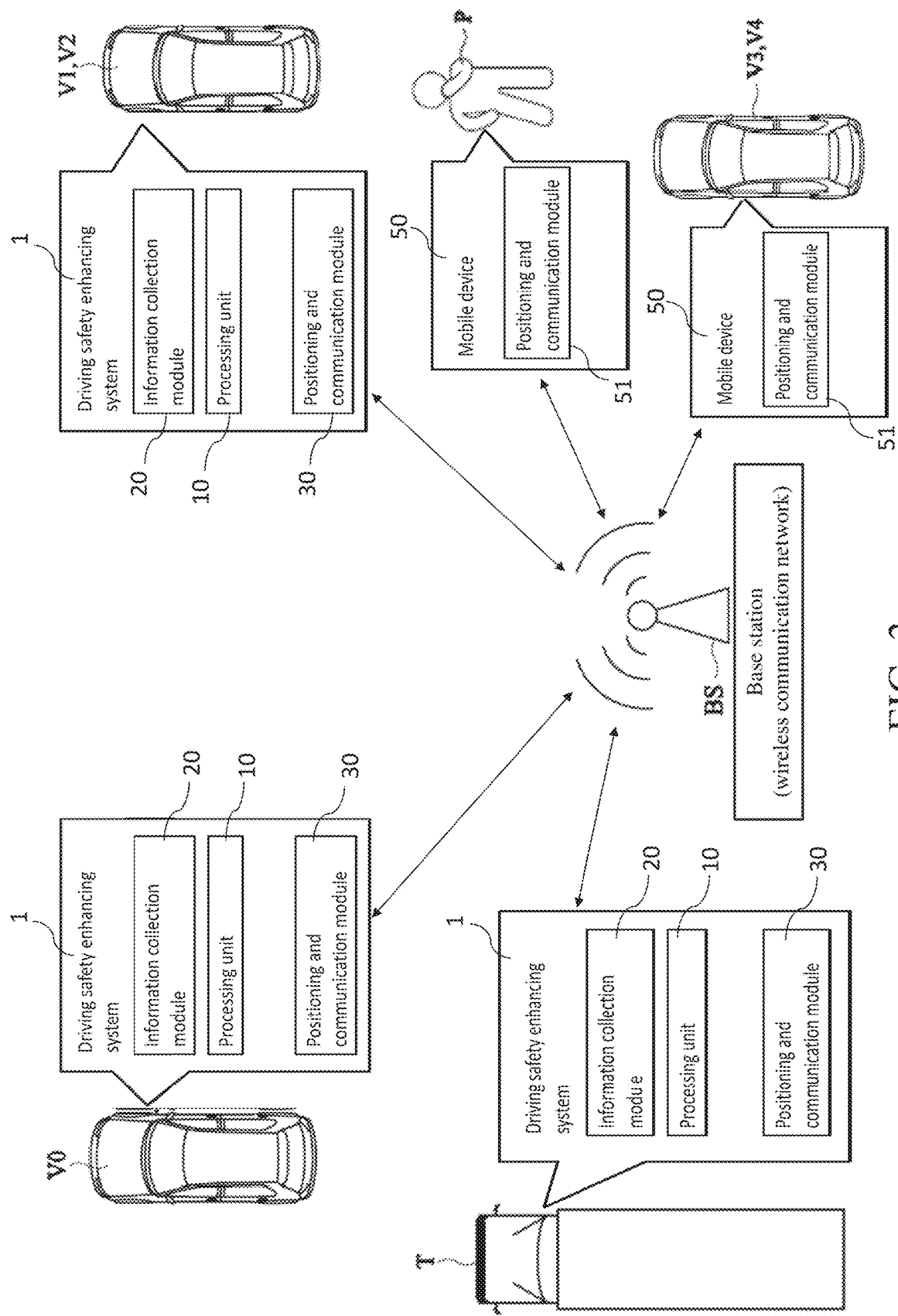
FIG. 3 shows the transmission of positioning information according to the invention.

Referring to FIG. 1 to FIG. 3, the main system structure of the driving safety enhancing system 1 of the present invention includes a processing unit 10, an information collection module 20, and a positioning and communication module 30. The information collection module 20 is connected to the processing unit 10 and includes a plurality of on-board sensors for sensing the surroundings of the vehicle to which the system is applied (hereinafter referred to as the vehicle at issue) and providing the sensing information obtained to the processing unit 10. The positioning and communication module 30 is connected to the processing unit 10 and is configured to obtain positioning signals, provide the positioning signals obtained to the processing unit 10 for computation, and transmit positioning information through the wireless communication network provided by a base station BS. The processing unit 10 is an electronic control unit (ECU) designed specifically for use in vehicles and is configured to perform analysis and computation, make judgments according to preset conditions, and output a control signal. The control signal may be a signal output to the power system of the vehicle at issue to control the engine throttle or the brake, or a signal output to an alarming device 43 to drive the alarming device 43 and thereby warn the driver of the vehicle at issue.

In this embodiment, and by way of example, the on-board sensors in the information collection module 20 are a combination of radars 21 (millimeter wave radars and ultrasonic radars) and image sensors 22 and are configured to sense the surroundings of the vehicle at issue and transmit the sensing information obtained to the processing unit 10 in order to identify targets (e.g., people or vehicles) around the vehicle at issue. In practice, the on-board sensors may additionally or alternatively include other sensing devices such as thermal radars and optical radars.

The positioning and communication module 30 essentially includes a satellite positioning unit 31 and a wireless communication unit 32. The satellite positioning unit 31 is configured to receive satellite positioning signals, i.e., GPS (Global Positioning System) positioning signals, and provide the satellite positioning signals (i.e., GPS positioning signals) obtained to the processing unit 10 in order to carry out satellite positioning (i.e., GPS positioning). The wireless communication unit 32 is configured to connect to the wireless communication network of the base station BS, obtain location-based service (LBS) positioning signals, and provide the LBS positioning signals obtained to the processing unit 10 in order to carry out LBS positioning.

The processing process of the processing unit 10 can be divided into a number of major procedures. In procedure S1, the satellite positioning signals (i.e., GPS positioning signals) received are used to perform satellite positioning (i.e., GPS positioning) and thereby obtain positioning coordinates of the vehicle at issue. In procedure S2, the LBS positioning signals received are used to perform LBS positioning and thereby obtain positioning coordinates of the vehicle at issue. In procedure S3, targets (e.g., people or vehicles) around the vehicle at issue are identified according to the sensing information received, the location of each target with respect to the vehicle at issue is analyzed according to the same information, the results of procedures S1 and S2 are combined to derive positioning coordinates of all the targets (e.g., people or vehicles) around the vehicle at issue from the positioning coordinates of the vehicle at issue, and the positioning coordinates of the vehicle at issue and of all the targets are aggregated into positioning information of the vehicle at issue. In procedure S4, the positioning information of the vehicle at issue is output through the wireless communication unit 32, extended positioning information provided by other people or vehicles is obtained through the wireless communication module 32 (wherein the extended positioning information at least includes positioning coordinates of each one of the other people or vehicles and may further include positioning coordinates of additional vehicles sensed and identified by each of the other vehicles), and the positioning information of the vehicle at issue and the extended positioning information obtained are combined and cross-compared to resolve the positioning coordinates of all the people or vehicles. Preferably, a range of, or distance from, the vehicle at issue is preset; positioning coordinates of people or vehicles that are within the preset range of the vehicle at issue and that demand attention are resolved; the positioning coordinates resolved are further integrated into a virtual map interface according to map information provided by a map database 41; and the virtual map interface is output to a display 42 to be visualized. In addition, procedure S4 includes performing a time sequence analysis on the moving courses and momentum (i.e., moving directions and speeds) of all the people or vehicles, generating distance-related alert values according to the moving course and momentum of the vehicle at issue, and outputting the control signal upon determining that the momentum of a target at a certain distance is lower than the corresponding alert value.

The system mechanism described above allows the system observation range to be set according to actual conditions or needs. For example, the default distance is five times the safe following distance, which varies with the speed of the vehicle at issue. That is to say, the system tracking and observation range may increase or decrease with the speed of the vehicle at issue and be many times as long as the safe following distance. Thus, when it is determined that something is happening in the distance (e.g., when the vehicle in front of the vehicle ahead slows down abruptly), the driver of the vehicle at issue will be warned in advance and be given enough time to respond. More specifically, the judgment mechanism of the system entails generating distance-related alert values according to the moving course and momentum of the vehicle at issue and outputting the control signal upon determining that the momentum of a target at a certain distance is lower than the corresponding alert value. For instance, when the vehicle at issue is a small vehicle and is moving forward at 100 km/h, the safe following distance ahead is about 50 m, so after combining all the positioning information obtained and analyzing targets within 250 m in front of the vehicle at issue automatically, the system may set the alert values as follows: the alert value for a target 50 m ahead is 100 (i.e., the speed of the target must not be lower than 100 km/h), the alert value for a target 100 m ahead is 70, the alert value for a target 150 m ahead is 40, and so on. When a vehicle 150 m ahead (which may be the second or third vehicle in front of the vehicle at issue and cannot be seen by the driver of the vehicle at issue) is suddenly braked and slows down to less than 40 km/h (i.e., to a speed lower than the corresponding alert value as judged by the system), the system will output the control signal according to the judgment and either slow down the vehicle at issue or alert the driver according to system settings so that the driver has enough time to respond. If the vehicle that slows down abruptly is the first vehicle in front of the vehicle at issue, the system can issue a warning without having to wait for the braked vehicle to enter the safe following distance as does a conventional warning system. If the braked vehicle is the second or third vehicle in front of the vehicle at issue, the driver of the vehicle at issue can start responding as soon as he or she is warned, without having to wait for the vehicle immediately in front to slow down, i.e., the driver can be informed of an emergency condition far ahead sooner, and therefore have a longer response time, than conventionally allowed.

In some feasible embodiments, the control signal may be output to the power system of the vehicle at issue to provide engine throttle control, brake control, or the like, or to the alarming device 43 connected to the processing unit 10 in order for the alarming device 43 to issue a warning (e.g., sound) to the driver. The alarming device 43 may be a buzzer or a voice playing device, for example.

Figure 4:
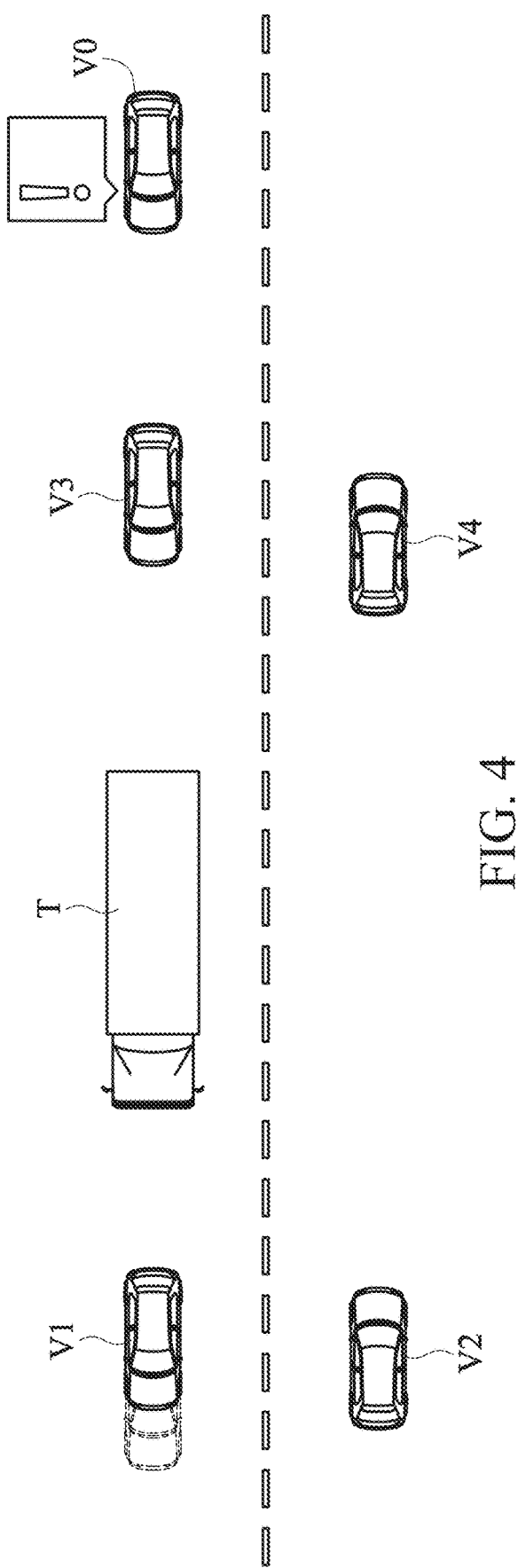
FIG. 4 shows a state of use of an embodiment of the invention.
Figure 5:
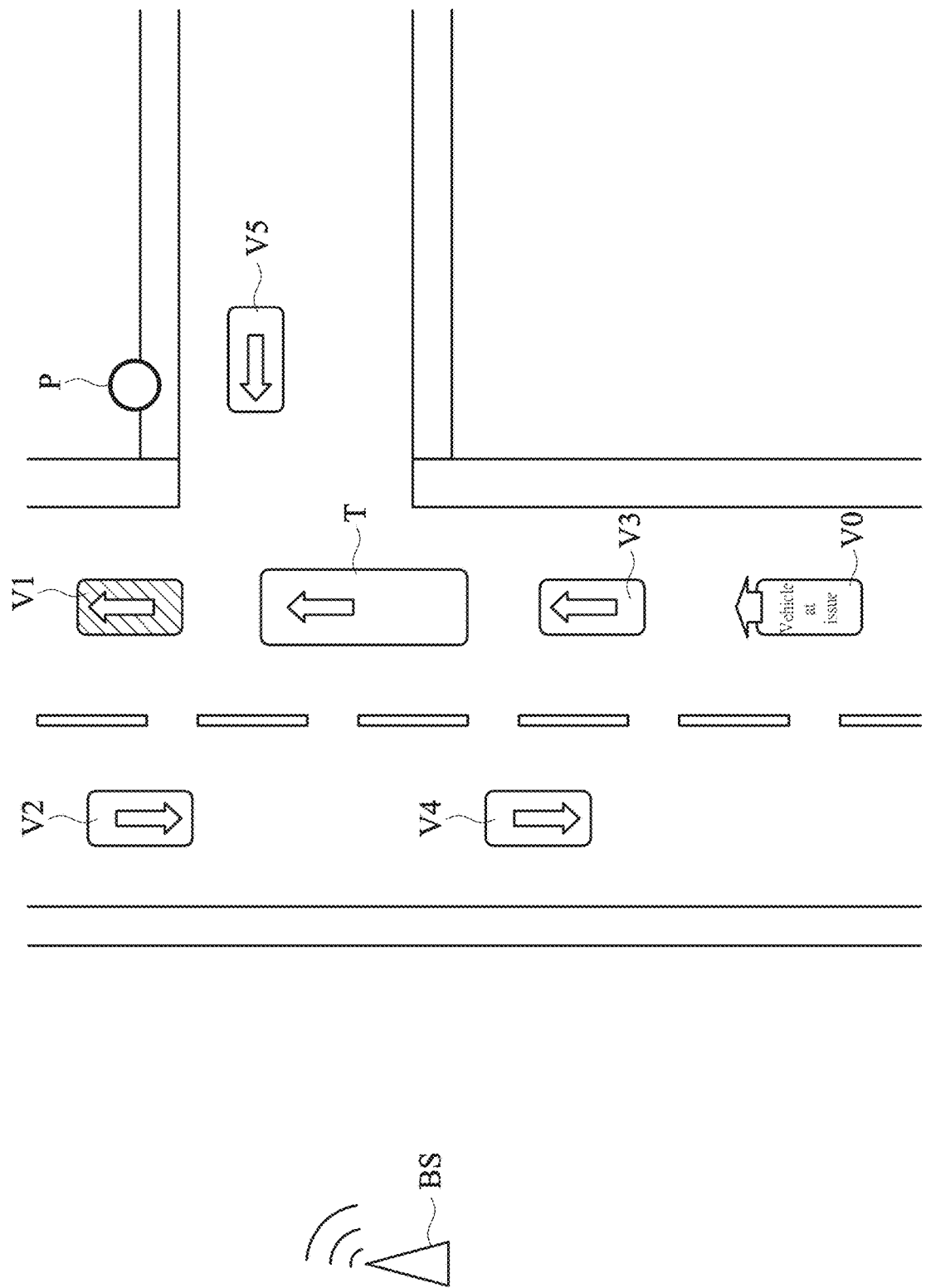
FIG. 5 shows a map interface corresponding to FIG. 4.

When the present invention is put to practical use, referring to FIG. 3 to FIG. 5, the positioning and communication module 30 in the driving safety enhancing system 1 on the vehicle at issue V0 can connect to the wireless communication network of the base station BS, share the positioning information of the vehicle at issue V0 (which information includes the location of the vehicle at issue V0 and the locations of those targets around, and sensed by, the vehicle at issue V0) with external devices, and obtain extended positioning information of other people or vehicles. When other vehicles (e.g., the vehicles V1, V2, and T in FIG. 3) also have the driving safety enhancing system 1, the vehicle at issue V0 can obtain extended positioning information of those vehicles (which information includes the locations of those vehicles and the locations of the targets around, and sensed by, those vehicles) through a positioning information sharing process. When other vehicles or people (e.g., the vehicles V3 and V4 and the person P in FIG. 3) do not have the driving safety enhancing system 1, the vehicle at issue V0 can still obtain extended positioning information of those vehicles or people (which information includes only the locations of the those vehicles or people) via the mobile devices carried by those vehicles or people, provided that the mobile devices can share the extended positioning information with the positioning and communication module 30 on the vehicle at issue V0. In either case, the driving safety enhancing system 1 on the vehicle at issue V0 will be able to combine and cross-compare the positioning information of the vehicle at issue V0 and all the extended positioning information to obtain the locations of all the people or vehicles identified, thereby tracking all the targets within the preset range of the vehicle at issue to provide advance early warning.

Referring to FIG. 4, the vehicle at issue V0 is moving forward at 80 km/h, and the range within which the system can track targets ahead of the vehicle at issue V0 and make corresponding judgments is 200 m. A vehicle V3 is about 40 m ahead of the vehicle at issue V0, a large vehicle T is about 80 m ahead of the vehicle at issue V0, a vehicle V1 is about 120 m ahead of the vehicle at issue V0 and cannot be directly seen by the driver of the vehicle at issue V0, and vehicles V2 and V4 are moving in the oncoming traffic lane. Thanks to an exchange of positioning information, the driving safety enhancing system 1 on the vehicle at issue V0 can detect vehicles or people that cannot be sensed by its information collection module 20, and display the vehicles or people thus detected on a map interface as shown in FIG. 5. For example, the map interface in FIG. 5 shows the additional person P and vehicle V5. When the vehicle at issue V0 runs at 80 km/h, and assuming that the preset alert conditions, or alert values, of the driving safety enhancing system 1 are: 80 for a target 40 m ahead, 60 for a target 80 m ahead, and 40 for a target 120 m ahead, the system will not issue a warning if the first vehicle V3, the second vehicle T, and the third vehicle V1 in front of the vehicle at issue V0 are all moving at 80 km/h, i.e., if the speeds of the three vehicles V3, T, and V1 are not lower than their respective alert values. When the third vehicle V1, which cannot be directly seen by the driver of the vehicle at issue V0, slows down, e.g., to less than 40 km/h (i.e., to a speed lower than the alert value 40 corresponding to the distance from the vehicle at issue V0 to the third vehicle V1, as judged by the system), the processing unit 10 of the driving safety enhancing system 1 will output the control signal according to the judgment so that, before the large vehicle T and the vehicle V3 become aware of the slowing of the vehicle V1 and begin to slow down sequentially, the driver of the vehicle at issue V0 will have enough time to respond, e.g., to stop accelerating or directly decelerate in response to the warning received; in other words, the driver of the vehicle at issue V0 does not have to wait until the first vehicle V3 ahead slows down before decelerating or braking hard. Thus, by providing accurate and advance early warning, the invention can increase driving comfort and safety effectively.

Furthermore, the driving safety enhancing system 1 of the present invention can continuously track and observe all the targets within a larger range than that of the prior art, allowing the driver of the vehicle at issue V0 to obtain information about targets that are not within their field of vision or that cannot be sensed by the vehicle at issue V0, such as the condition of a vehicle in a neighboring lane or the traffic in the oncoming traffic lane. Not only can this information be used as a reference when the driver intends to change lanes or overtake using the oncoming traffic lane, but also the system can make corresponding judgments and provide necessary warning while the driver is actually doing so. For example, as soon as the left/right turn signals are activated, the system begins to judge the traffic in the left/right lane(s) in order to alert the driver if necessary.

Figure 6:
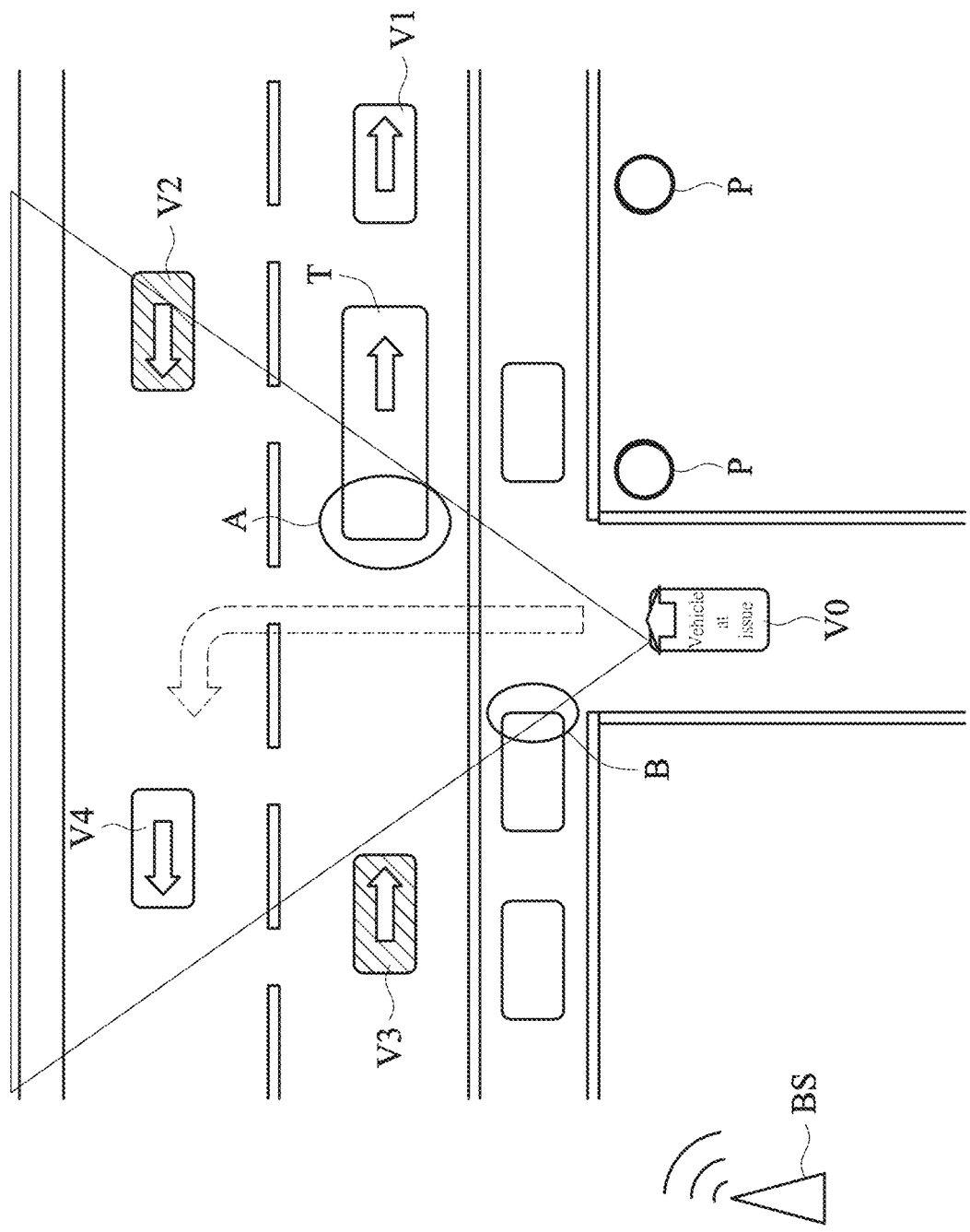
FIG. 6 shows a map interface corresponding to a state of use of another embodiment of the invention.

In the scenario shown in FIG. 6, the vehicle at issue V0 is about to come out of an alley, and the driver's sight or the sensing range of the information collection module 20 on the vehicle at issue V0 is so limited that the driver is aware only of the large vehicle T in the closest lane to enter, the vehicle V4 in the farther opposite-traffic lane, and the pedestrian P on the roadside, and that vehicles V2 and V3 are blocked by areas A and B respectively and therefore cannot be seen. If the driver judges from what he or she can directly see and decides to drive out of the alley right away, a traffic accident is very likely to occur. If, however, the driving safety enhancing system 1 of the present invention is allowed to assist, the sharing and cross-comparison of positioning information will enable the driver to discover the otherwise unnoticeable vehicles V2 and V3 through the map interface shown by the display 42, or when the left turn signals are activated, the system will analyze the moving courses and speeds of the oncoming vehicles V2 and V3 and warn the driver accordingly so that the driver can foresee people or vehicles that are hidden from view, thereby achieving the objective of spotting more targets accurately to ensure driving safety.

Figure 7:
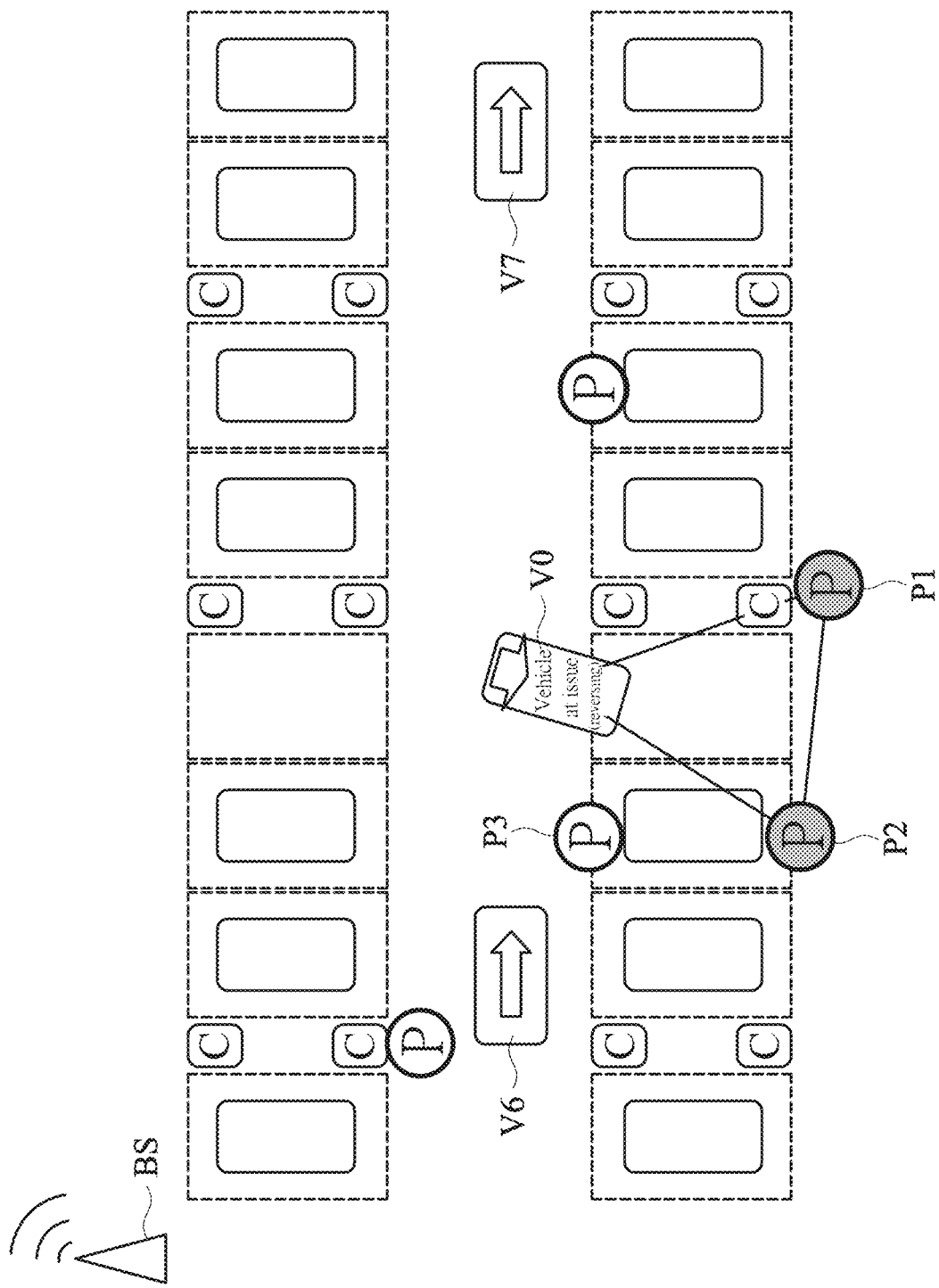
FIG. 7 shows a map interface corresponding to a state of use of yet another embodiment of the invention.
Figure 8:
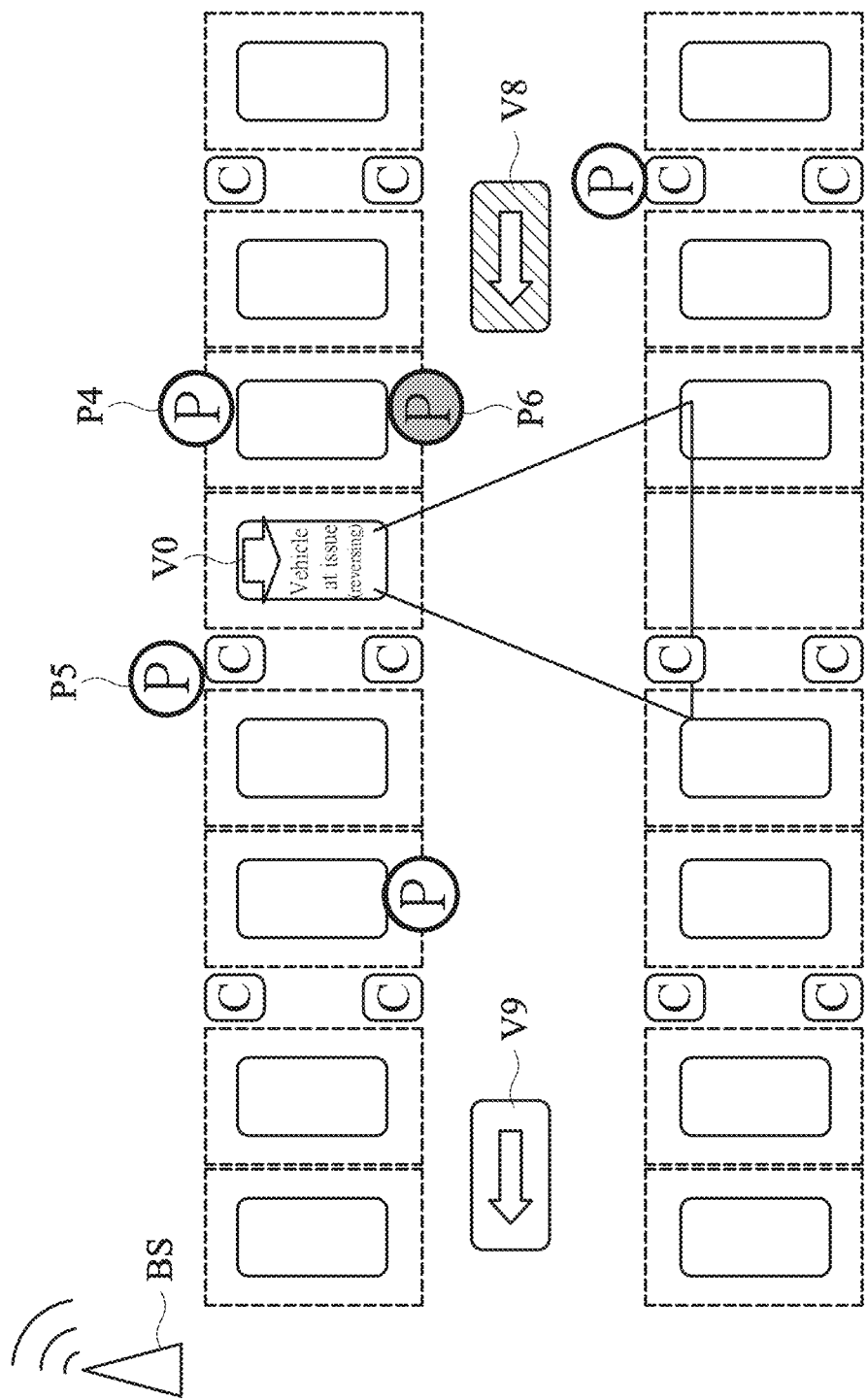
FIG. 8 shows a map interface corresponding to a state of use of still another embodiment of the invention.

Moreover, in an environment where obstacles abound, such as in the parking lot scenarios shown in FIG. 7 and FIG. 8, the driving safety enhancing system 1 of the present invention helps enhance the safety of the driver of the vehicle at issue V0 and others. In FIG. 7, in which the vehicle at issue V0 is reversing into a parking space, both the driver's eyes and the on-board information collection module 20 are obstructed by the surrounding obstacles from perceiving targets behind those obstacles, such as the pedestrian P1 behind a column C and the pedestrian P2 behind an adjacent vehicle. If the driver fails to pay due attention, the vehicle at issue V0 may collide with or even injure those people. The driving safety enhancing system 1, on the other hand, can share and exchange positioning information through the positioning and communication module 30 and, based on the driver's driving condition, show targets within a certain range of the vehicle at issue on a map interface, if not providing system judgment about the presence of the people P1 and P2 within a rear surveillance range according to the reversing condition of the vehicle at issue V0 and issuing a warning in a timely manner to ensure the driver's safety and the safety of others.

FIG. 8 shows another possible parking lot scenario, in which the vehicle at issue V0 is about to reverse out of its parking space. Neither the driver's eyes nor a conventional on-board sensor can perceive vehicles or pedestrians approaching from outside a certain range. With the driving safety enhancing system 1 of the present invention, however, the driver of the vehicle at issue V0 can clearly see in the map interface the person P5 in front of a column C, the people P4 and P6 at the front and rear of an adjacent vehicle, and the approaching vehicle V8 in the parking aisle, or the system can judge from the reversing condition of the vehicle at issue V0 and inform the driver to watch out for the person P6 and the approaching vehicle V8. In either case, driving safety is effectively enhanced.

To sum up, the driving safety enhancing system and method disclosed herein for making or enabling highly accurate judgment and providing advance early warning feature an exchange of information that allows more targets to be identified than by the prior art, and that therefore facilitates accurate judgment and early warning. Moreover, the performance of the disclosed system and method is not subject to weather conditions or the environment, and this ensures that the driving safety enhancing system has high accuracy. The system and method disclosed herein are indeed a novel and non-obvious invention, so a patent application therefor is hereby filed according to law. It should be pointed out that the contents of this specification serve only to describe some preferred embodiments of the invention. Any variation, modification, change, or equivalent substitution that is based on the technical means of the invention and the appended claims shall fall within the scope of the invention.

What is claimed is:

1. A method for making or enabling highly accurate judgment and providing advance early warning, wherein the method is applied to a driving safety enhancing system, the driving safety enhancing system comprises an information collection module and a processing unit, the information collection module comprises a plurality of on-board sensors for sensing surroundings of a vehicle at issue and thereby obtaining sensing information of the vehicle at issue, and the processing unit is connected to the information collection module and is configured for identifying people or vehicles around the vehicle at issue according to the sensing information and, after analysis and judgment, outputting a control signal if necessary, the method being characterized by comprising the steps of:

providing a positioning and communication module connected to the processing unit;

obtaining positioning signals via the positioning and communication module, determining locations of the vehicle at issue and of the people or vehicles around the vehicle at issue according to the positioning signals, and thereby obtaining positioning information of the vehicle at issue;

obtaining extended positioning information of other people or vehicles via the positioning and communication module through wireless communication;

combining and cross-comparing the positioning information of the vehicle at issue and the extended positioning information in order to identify all people or vehicles within a predetermined range of the vehicle at issue, wherein the predetermined range of the vehicle at issue is increased or decreased with a speed of the vehicle at issue; and analyzing and judging changes in moving states of all the people or vehicles in order to output the control signal if necessary, wherein said analyzing and judging the changes in the moving states of all the people or vehicles comprises performing a time sequence analysis on moving courses and momentum of all the people or vehicles, generating distance-related alert values according to a moving course and momentum of the vehicle at issue, and upon determining that the momentum of a said person or vehicle at a distance from the vehicle at issue is lower than a corresponding one of the alert values, outputting the control signal.

2. The method of claim 1, wherein the positioning and communication module comprises a wireless communication unit for connecting with a wireless communication network, obtaining location-based service (LBS) positioning signals through the wireless communication network, and transmitting the positioning information of the vehicle at issue and the extended positioning information through the wireless communication network.

3. The method of claim 2, wherein the positioning and communication module further comprises a satellite positioning unit for receiving satellite positioning signals.

4. A driving safety enhancing system for making or enabling highly accurate judgment and providing advance early warning, comprising
an information collection module and a processing unit, wherein
the information collection module comprises a plurality of on-board sensors for sensing surroundings of a vehicle at issue and thereby obtaining sensing information of the vehicle at issue, and
the processing unit is connected to the information collection module and is configured for identifying people or vehicles around the vehicle at issue according to the sensing information and, after analysis and judgment, outputting a control signal if necessary, the driving safety enhancing system being characterized in that:
the driving safety enhancing system further comprises a positioning and communication module,
wherein the positioning and communication module is connected to the processing unit and is configured for obtaining positioning signals and transmitting positioning information;
wherein the processing unit is configured for
determining locations of the vehicle at issue and of the people or vehicles around the vehicle at issue according to the positioning signals and thereby obtaining positioning information of the vehicle at issue;
obtaining extended positioning information of other people or vehicles via the positioning and communication module;
combining and cross-comparing the positioning information of the vehicle at issue and the extended positioning information in order to identify all people or vehicles within a predetermined range of the vehicle at issue; and
analyzing and judging changes in moving states of all the people or vehicles in order to output the control signal if necessary; and
wherein the processing unit is an electronic control unit (ECU) and is configured for
performing a time sequence analysis on moving courses and momentum of all the people or vehicles,
generating distance-related alert values according to a moving course and momentum of the vehicle at issue, and
upon determining that the momentum of a said person or vehicle at a distance from the vehicle at issue is lower than a corresponding one of the alert values, outputting the control signal.

5. The driving safety enhancing system of claim 4, wherein the positioning and communication module comprises a wireless communication unit for connecting with a wireless communication network, obtaining location-based service (LBS) positioning signals through the wireless communication network, and transmitting the positioning information of the vehicle at issue and the extended positioning information through the wireless communication network.

6. The driving safety enhancing system of claim 5, wherein the positioning and communication module further comprises a satellite positioning unit for receiving satellite positioning signals.

7. The driving safety enhancing system of claim 4, wherein the on-board sensors are one, or a combination of at least two, of millimeter wave radars, ultrasonic radars, thermal radars, optical radars, and image sensors.

8. The driving safety enhancing system of claim 5, wherein the on-board sensors are one, or a combination of at least two, of millimeter wave radars, ultrasonic radars, thermal radars, optical radars, and image sensors.

9. The driving safety enhancing system of claim 6, wherein the on-board sensors are one, or a combination of at least two, of millimeter wave radars, ultrasonic radars, thermal radars, optical radars, and image sensors.

* * * * *